US012619739B2

(12) United States Patent
Aoshima et al.

(10) Patent No.: US 12,619,739 B2
(45) Date of Patent: May 5, 2026

(54) DETECTION DEVICE, DETECTION METHOD, AND DETECTION PROGRAM

(71) Applicant: NTT, Inc., Tokyo (JP)

(72) Inventors: Tatsuhiro Aoshima, Tokyo (JP);
Toshinori Usui, Tokyo (JP); **Yuhei
Kawakoya, Tokyo (JP); Makoto
Iwamura, Tokyo (JP); Jun Miyoshi**,
Tokyo (JP)

(73) Assignee: NTT, Inc., Tokyo (JP)

( * ) Notice: Subject to any disclaimer, the term of this
patent is extended or adjusted under 35
U.S.C. 154(b) by 222 days.

(21) Appl. No.: 18/557,027

(22) PCT Filed: Apr. 27, 2021

(86) PCT No.: PCT/JP2021/016864
§ 371 (c)(1),
(2) Date: Oct. 24, 2023

(87) PCT Pub. No.: WO2022/230074
PCT Pub. Date: Nov. 3, 2022

(65) Prior Publication Data
US 2024/0370571 A1      Nov. 7, 2024

(51) Int. Cl.
*G06F 21/57* (2013.01)
*G06F 11/3604* (2025.01)

(52) U.S. Cl.
CPC ........ *G06F 21/577* (2013.01); *G06F 11/3604*
(2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 11,860,996 B1* | 1/2024 | Pizlo | ...................... | G06F 8/434 |
| 2003/0097581 A1* | 5/2003 | Zimmer | .................. | G06F 21/57 |
| | | | | 726/10 |
| 2004/0117746 A1* | 6/2004 | Narain | .................... | G06F 30/33 |
| | | | | 716/106 |
| 2010/0169868 A1* | 7/2010 | Condit | ...................... | G06F 8/40 |
| | | | | 717/136 |
| 2012/0254827 A1* | 10/2012 | Conrad | ..................... | G06F 8/35 |
| | | | | 717/104 |
| 2012/0254830 A1* | 10/2012 | Conrad | ............... | G06F 11/3604 |
| | | | | 717/106 |

(Continued)

OTHER PUBLICATIONS

Haller et al. "TypeSan: Practical Type Confusion Detection", ACM,
2016, pp. 517-528. (Year: 2016).*

(Continued)

*Primary Examiner* — Kaveh Abrishamkar

(57) ABSTRACT

An unsafe location enumeration unit (131) enumerates,
based on a code of a program, locations that do not satisfy
a predetermined condition indicating that type conversion is
safe among locations where a type casting occurs in the
program. A context extraction unit (132) transition an
automaton corresponding to the locations enumerated by the
unsafe location enumeration unit (131) and extract a context
reaching the locations. A vulnerability verification unit (133)
verifies whether the location extracted by the context extrac-
tion unit (132) satisfies an annotation prepared in advance.

20 Claims, 10 Drawing Sheets

(56) References Cited

U.S. PATENT DOCUMENTS

2019/0121716 A1 * 4/2019 Kurmus ................. G06F 21/00

OTHER PUBLICATIONS

Chen et al. "MOPS: an Infrastructure for Examining Security Properties of Software", CCS'02 Nov. 18-22, 2002, pp. 235-244. (Year: 2002).*

Jhala et al. (2007) "State of the Union: Type Inference via Craig Interpolation" TACAS, Mar. 9, 2007, pp. 553-567.

Chandra et al. (1999) "Physical Type Checking for C" Bell Laboratories Technical Report, Mar. 22, 1999, pp. 1-26.

Chugh et al. (2012) "Nested Refinements: A Logic for Duck Typing" POPL'12, Jan. 25, 2012, pp. 231-241.

Diwan et al. (1998) "Type-Based Alias Analysis" SIGPLAN '98, May 1, 1998, pp. 106-117.

Chugh et al. (2011) "Nested Refinements for Dynamic Languages" arXiv, Sep. 15, 2011.

* cited by examiner

Fig. 3

NOTATION OF REFINEMENT TYPE

ExtType  :: = ExtIdent Type  ;; SET OF ExtIdent INDICATING LOCATION TO WHICH REFINEMENT TYPE IS APPLIED AND Type (PROTOTYPE) OF ORIGINAL FIELD
ExtIdent  :: = ExtName AppId Offset  ;; ID OF REFINEMENT TYPE, SET OF APPLICATION NAME ExtName, APPLICATION NUMBER AppId, AND OFFSET Offset
ExtName  :: = CastTarget Name  ;; TYPE OF LOCATION OF VALUE OF REFINEMENT TYPE Name OF PATTERN Cast
           | CastTag Name Id  ;; TYPE OF Id-TH TAG OF REFINEMENT TYPE Name OF PATTERN Cast
           | DowncastTarget Name  ;; TYPE OF DOWNCAST SOURCE OF REFINEMENT TYPE Name OF PATTERN Downcast
           | DowncastSubtarget Name Id  ;; TYPE OF Id-TH DOWNCAST DESTINATION OF REFINEMENT TYPE Name OF PATTERN Downcast
           | DowncastTag Name Id  ;; TYPE OF Id-TH TAG IN DOWNCAST OF REFINEMENT TYPE Name OF PATTERN Downcast
           | RestrictBase Name  ;; TYPE OF REFINEMENT TYPE Name OF PATTERN Restrict
AppId  :: = NonNegativeInteger  ;; DESIGNATING NUMBER OF APPLICATION COMMAND
Offset  :: = NonNegativeInteger  ;; DESIGNATING OFFSET IN STRUCTURE

Fig. 7

SYNTAX OF ANNOTATION DESCRIPTION LANGUAGE (BNF NOTATION)

Annot ::= AnnotCommand * :: ANNOTATION IS MADE BY ZERO OR MORE COMMANDS

AnnotCommand ::= DefineRefiner | ApplyRefiner :: COMMAND IN ANNOTATION

DefineRefiner ::= " define-refiner " Name CastMatch :: REFINEMENT TYPE OF NAME Name IS DEFINED CastMatch ::= " cast-match " ( Cond "⇒" Type )* :: LIST OF DEFINITION BODIES OF REFINEMENT TYPE (CASTING DESTINATION TYPES CORRESPONDING TO CASTING CONDITIONS)
| " restrict-cast-match " Name Type* :: CASTING DESTINATION OF REFINEMENT TYPE Name IS LIMITED TO ONLY THOSE INCLUDED IN LIST OF TYPES Cond :: OMISSION (NOT LIMITED TO CORRESPONDING RANGE OF THEORETICAL SOLVER)

Type :: OMISSION (NOT LIMITED IN TYPE DEFINED BY INTERMEDIATE LANGUAGE (LANGUAGE TO BE ANALYZED) FOR COMPILER SUCH AS LLVMIR)

ApplyRefiner ::= " apply-refiner " Name Fieldptr RefinerApp
:: FIELD Fieldptr IN STRUCTURE Name IS SUBJECTED TO A REFINEMENT TYPE APPLICATION RefinerApp RefinerApp ::= " cast " Name Fieldptr*
:: IN APPLICATION OF REFINEMENT TYPE Name, TAG VARIABLE SEQUENCE IS SET TO Fieldptr* (pattern Cast)
| " downcast " Name Fieldptr*
:: IN APPLICATION OF REFINEMENT TYPE Name, TAG VARIABLE SEQUENCE IS SET TO Fieldptr* (PATTERN Downcast)
| " restrict " Name :: REFINEMENT TYPE Name TO BE CONTROLLED IS APPLIED (PATTERN Restrict)

Fieldptr ::= NonNegativeInteger * :: SEQUENCE OF FIELD NUMBERS IN (RECURSIVE) STRUCTURE

Fig. 8

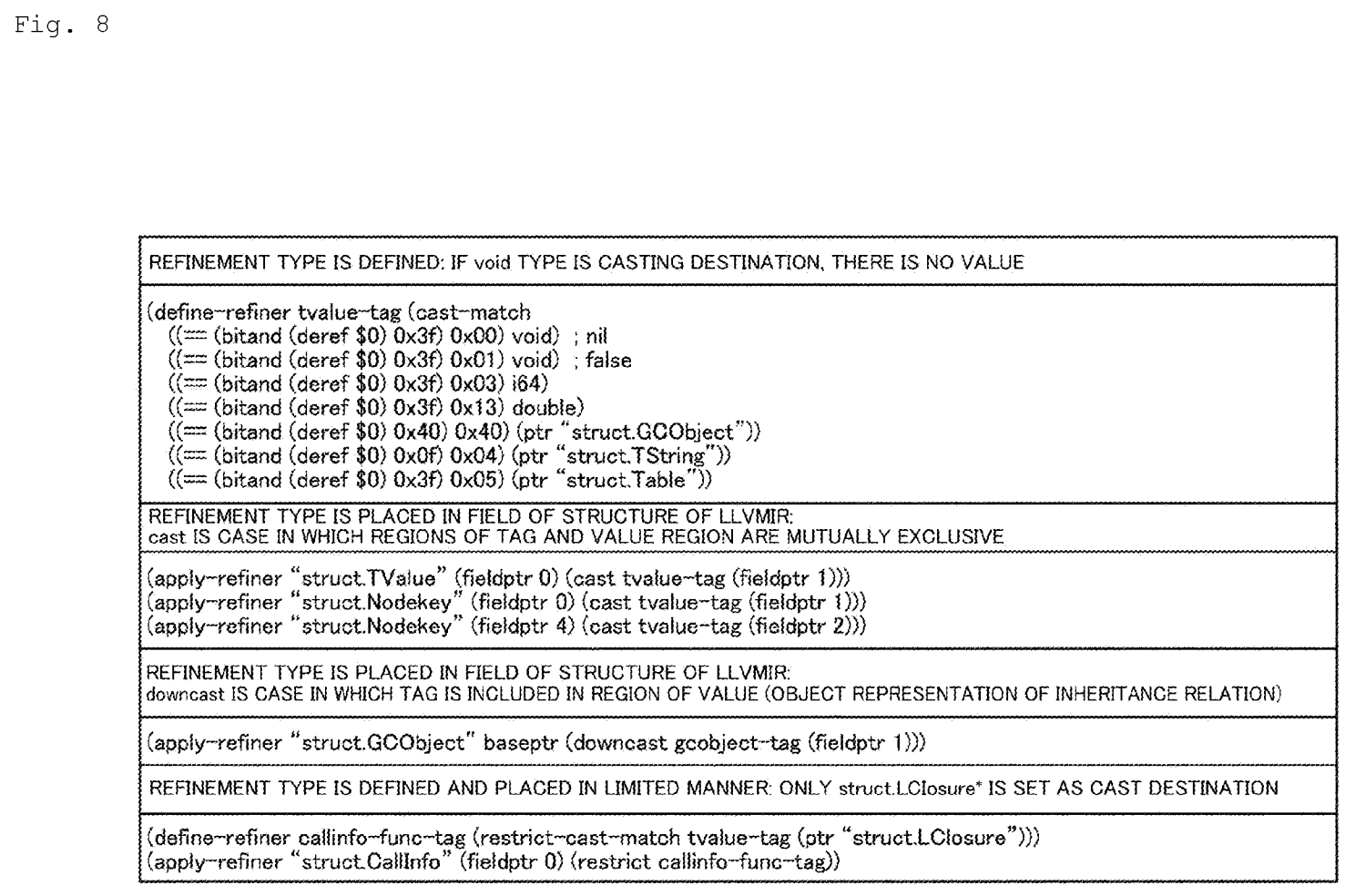

REFINEMENT TYPE IS DEFINED: IF void TYPE IS CASTING DESTINATION, THERE IS NO VALUE

```
(define-refiner tvalue-tag (cast-match
  ((== (bitand (deref $0) 0x3f) 0x00) void)  ; nil
  ((== (bitand (deref $0) 0x3f) 0x01) void)  ; false
  ((== (bitand (deref $0) 0x3f) 0x03) i64)
  ((== (bitand (deref $0) 0x3f) 0x13) double)
  ((== (bitand (deref $0) 0x40) 0x40) (ptr "struct.GCObject"))
  ((== (bitand (deref $0) 0x0f) 0x04) (ptr "struct.TString"))
  ((== (bitand (deref $0) 0x3f) 0x05) (ptr "struct.Table")))
```

REFINEMENT TYPE IS PLACED IN FIELD OF STRUCTURE OF LLVMIR: cast IS CASE IN WHICH REGIONS OF TAG AND VALUE REGION ARE MUTUALLY EXCLUSIVE

```
(apply-refiner "struct.TValue" (fieldptr 0) (cast tvalue-tag (fieldptr 1)))
(apply-refiner "struct.Nodekey" (fieldptr 0) (cast tvalue-tag (fieldptr 1)))
(apply-refiner "struct.Nodekey" (fieldptr 4) (cast tvalue-tag (fieldptr 2)))
```

REFINEMENT TYPE IS PLACED IN FIELD OF STRUCTURE OF LLVMIR: downcast IS CASE IN WHICH TAG IS INCLUDED IN REGION OF VALUE (OBJECT REPRESENTATION OF INHERITANCE RELATION)

```
(apply-refiner "struct.GCObject" baseptr (downcast gcobject-tag (fieldptr 1)))
```

REFINEMENT TYPE IS DEFINED AND PLACED IN LIMITED MANNER: ONLY struct.LClosure* IS SET AS CAST DESTINATION

```
(define-refiner callinfo-func-tag (restrict-cast-match tvalue-tag (ptr "struct.LClosure")))
(apply-refiner "struct.CallInfo" (fieldptr 0) (restrict callinfo-func-tag))
```

Fig. 9

```
; <label>.21:                            ; preds = %10
%22 = load %union.Node*, %union.Node** %2, align 8, !dbg !2715
%23 = bitcast %union.Node* %22 to %struct.NodeKey*, !dbg !2715
%24 = getelementptr inbounds %struct.NodeKey, %struct.NodeKey* %23, i32 0, i32 2.
store i8 5, i8* %24 ; **tvalue-tag.cast-tag0@2+9
%25 = load %union.Node*, %union.Node** %2, align 8, !dbg !2715
%26 = bitcast %union.Node* %25 to %struct.NodeKey*, !dbg !2715
%27 = getelementptr inbounds %struct.NodeKey, %struct.NodeKey* %26, i32 0, i32 4,
%28 = bitcast %union.Value* %27 to %struct.GCObject**, !dbg !2715
store %struct.GCObject* null, %struct.GCObject** %28 ; **tvalue-tag.cast-target@2+16
``` store %struct.GCObject* to **tvalue-tag.cast-target@2+16

(1) CASTING LOCATIONS WHICH ARE NOT NECESSARILY SAFE ARE ENUMERATED (STRUCTURAL INSPECTION)

(3) CONDITIONS ARE EXTRACTED FROM TERMINATION CONDITIONS OF AUTOMATON AND SPECIFICATION IS SATISFIED BY THEORETICAL SOLVER (THEORETICAL SOLVER)

✓ $tag == 0x05 ⇒ ($tag&0x3f) == 0x05 for casting $target as Table* (be able to cast as GCObject*)
✗ $tag == 0x05 ⇒ ($tag&0x3f) == 0x04 for casting $target as TString* (be able to cast as GCObject*)

Boxes:
- store i8 5,    &*%2[0][9]
- store i8 5,    &*%22[0][9]
- store i8 5,    &*%23[0][9]
- store i8 5,    &*%24[0][9]
- store null,    &*%2[0][16]
- store null,    &*%25[0][16]
- store null,    &*%26[0][16]
- store null,    &*%27[0][0]
- store null,    &*%28[0][0]

(2) CONDITION EXECUTION CONTEXT IN WHICH CORRESPONDING LOCATION IS EXECUTED IS EXTRACTED <NESTED AUTOMATON>

... OF AUTOMATON AND IT IS VERIFIED WHETHER

◆ REFINEMENT TYPE SUCH AS tvalue-tag IS SET IN CERTAIN FIELD (@2) AND IT IS INSPECTED WHETHER REFINEMENT TYPE CAN BE STORED IN CAST DESTINATION
◆ WHEN CAUTION IS PAID TO OFFSET (+9, +16), IT IS UNDERSTOOD THAT FIELDS IN %2[0][9] AND %2[0][16] ARE TAG AND VALUE, RESPECTIVELY

DETECTION DEVICE, DETECTION METHOD, AND DETECTION PROGRAM

CROSS-REFERENCE TO RELATED APPLICATIONS

This application is a U.S. 371 Application of International Patent Application No. PCT/JP2021/016864, filed on 27 Apr. 2021, the disclosure of which is hereby incorporated herein by reference in its entirety.

TECHNICAL FIELD

The present invention relates to a detection device, a detection method, and a detection program.

BACKGROUND ART

In the related art, a union type inspection technology for a subset of C language other than a pointer type is known (for example, see NPT 1).

The technology described in NPT 1 extracts execution context from a conditional statement and a substitution statement while performing structural type inspection and verifies whether an extracted condition satisfies a union type specification using a theoretical solver.

Further, the technology described in NPT 1 can cope with a pointer type by calculating candidates for an indicator of a pointer in combination with pointer analysis. The theoretical solver may be a satisfiability modulo theories (SMT) solver or the like.

CITATION LIST

Non Patent Literature

[NPT 1] Jhala, R., et al. (2007), "State of the Union: Type Inference via Craig Interpolation." TACAS.

SUMMARY OF INVENTION

Technical Problem

However, in the technology of the related art, there is a problem that type confusion vulnerability may not be detected efficiently. The type confusion vulnerability is a bug in which a program confuses a data type.

Since a computer expresses all data with 0 and 1, it cannot be distinguished whether the data is a numerical value, a character, or an image and the program determines a data type.

Therefore, when a computer confuses an integer and a pointer, for example, a numerical value (integer) prepared by an attacker may be misunderstood as a numerical value (pointer) indicating a location address of data or the program. Accordingly, there is a risk that data leakage, alteration, and malicious arbitrary code execution will occur.

For example, in the technology of the prior art, since it is assumed that there is no pointer, there is a problem that a union type value and a tag variable can be rewritten superficially via a completely different pointer variable.

In addition, since an indicator of a pointer cannot be correctly calculated in pointer analysis, the candidates for the indicator of the pointer are missed or the candidates for the indicator of the pointer are infinite in some cases. Accordingly, vulnerability may be missed or analysis may not be finished.

Further, types selected from union types are incompatible with each other (upcasting at C and C++ is not possible), and the conditions are also mutually exclusive (two or more conditions may not be all satisfied). Therefore, the technology of the related art cannot cope with classes having an inheritance relation such as C++ which is seen to be object-oriented.

Solution to Problem

In order to solve the foregoing problems and to achieve an objective, a detection device includes: an enumeration unit configured to enumerate, based on a code of a program, locations that do not satisfy a predetermined condition indicating that type conversion is safe among locations where a type casting occurs in the program; an extraction unit configured to transition an automaton corresponding to the locations enumerated by the enumeration unit and extract a context reaching the locations; and a verification unit configured to verify whether the location extracted by the extraction unit satisfies an annotation prepared in advance.

Advantageous Effects of Invention

According to the present invention, it is possible to effectively detect the type confusion vulnerability.

BRIEF DESCRIPTION OF DRAWINGS

FIG. 3 is a diagram illustrating an example of notation of a refinement type.

FIG. 7 is a diagram illustrating an example of a syntax of a descriptive language of an annotation.

FIG. 8 is a diagram illustrating an example of an annotation.

FIG. 9 is a diagram illustrating an exemplary operation.

DESCRIPTION OF EMBODIMENTS

Embodiments of a detection device, a detection method, and a detection program according to the present application will be described below in detail with reference to the drawings. The present invention is not limited to the embodiments to be described below.

Configuration of First Embodiment

Figure 1:
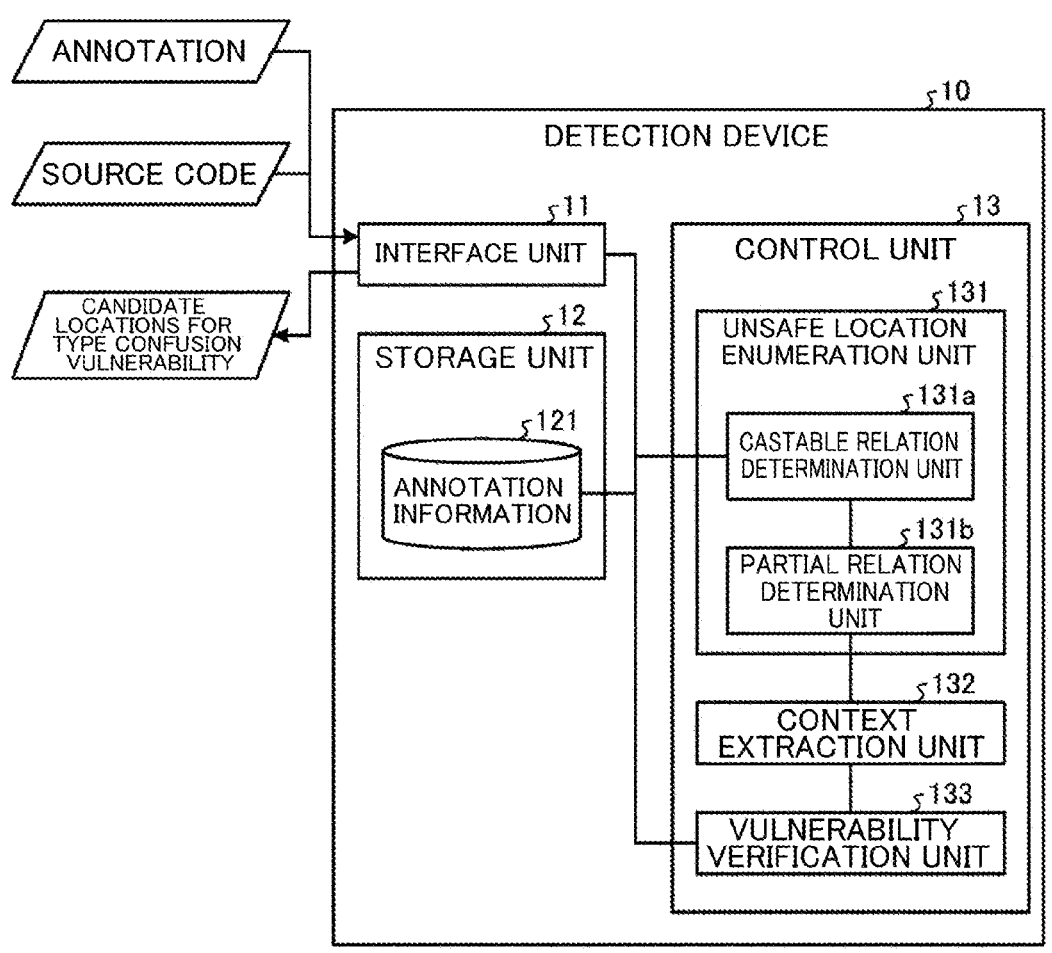
FIG. 1 is a diagram illustrating an exemplary configuration of a detection device according to a first embodiment.

First, a configuration of a detection device according to a first embodiment will be described with reference to FIG. 1. FIG. 1 is a diagram illustrating an exemplary configuration of the detection device according to the first embodiment. As illustrated in FIG. 1, a detection device 10 receives an input of a source code and an annotation, detects type confusion vulnerability, and outputs candidate locations of the type confusion vulnerability.

For example, the source code is IR code (intermediate code) of LLVM (reference URL: Https://llvm.org/docs/index.html).

Here, each unit of the detection device 10 will be described. As illustrated in FIG. 1, the detection device 10 includes an interface unit 11, a storage unit 12, and a control unit 13.

The interface unit 11 is an interface for inputting and outputting data. For example, the interface unit 11 is a network interface card (NIC). The interface unit 11 can transmit and receive data to and from another device.

The interface unit 11 may be connected to an input device such as a mouse or a keyboard. The interface unit 11 may be connected to output devices such as a display and a speaker.

The storage unit 12 is a storage device such as a hard disk drive (HDD), a solid state drive (SSD), or an optical disc. The storage unit 12 may be a semiconductor memory capable of rewriting data, such as a random access memory (RAM), a flash memory, or a nonvolatile static random access memory (NVSRAM).

The storage unit 12 stores an operating system (OS) and various types of programs that are executed in the detection device 10. The storage unit 12 also stores annotation information 121. The annotation information 121 may be arbitrarily given by the user, but is not limited to this configuration. For example, the annotation information 121 may be stored in advance in the detection device 10.

The control unit 13 controls the entire detection device 10. The control unit 13 is, for example, an electronic circuit such as a central processing unit (CPU), a micro processing unit (MPU), or a graphics processing unit (GPU), or an integrated circuit such as an application specific integrated circuit (ASIC) or a field programmable gate array (FPGA). The control unit 13 includes an internal memory that stores a program or control data that defines various processing procedures, and executes each processing using an internal memory.

The control unit 13 functions as various processing units by operating various programs. For example, the control unit 13 includes an unsafe location enumeration unit 131, a context extraction unit 132, and a vulnerability verification unit 133. The unsafe location enumeration unit 131 has a castable relation determination unit 131*a* and a partial relation determination unit 131*b*.

Figure 2:
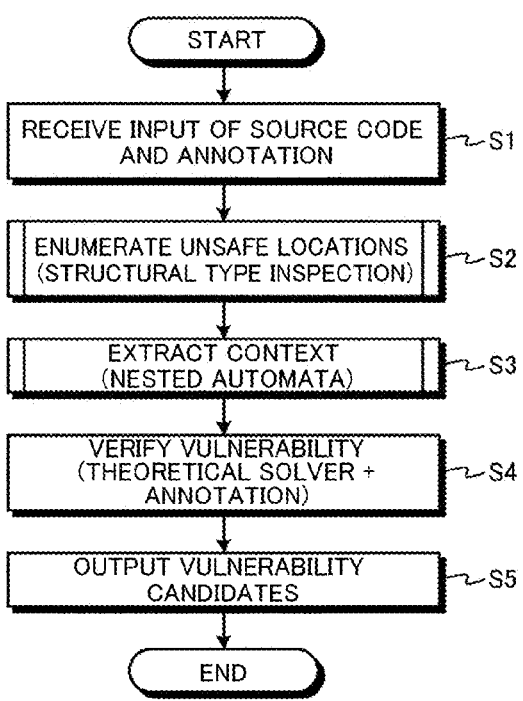
FIG. 2 is a flowchart illustrating a flow of a detection process.

A flow of detection processing by the detection device 10 will be described with reference to FIG. 2. FIG. 2 is a flowchart showing a flow of detection processing. As illustrated in FIG. 2, the detection device 10 first receives an input of a source code and an annotation (step S1).

For example, the source code is a code with a static single assignment (SSA) format such as LLVMIR. In the code with the SSA format, a local variable is assigned only once at most.

Next, the unsafe location enumeration unit 131 performs enumeration of unsafe locations (structural type inspection) (step S2). Subsequently, the context extraction unit 132 extracts a context related to the unsafe location (step S3). Then, the vulnerability verification unit 133 verifies vulnerability by the theoretical solver and the annotation (step S4). The detection device 10 outputs vulnerability candidates (step S5).

The processing by the unsafe location enumeration unit 131, the context extraction unit 132, and the vulnerability verification unit 133 will be described below in detail.

The unsafe location enumeration unit 131 enumerates locations (unsafe locations) which do not satisfy a predetermined condition indicating that type conversion is safe among locations where type casting occurs in the program based on the code of the program. The unsafe location enumeration unit 131 is an example of an enumeration unit.

The unsafe location enumeration unit 131 enumerates unsafe locations by performing structural type inspection on the source code.

Thus, a location of a command which can be determined to be safe from the viewpoint of only the structure of a type is removed from analysis targets at the rear stage, and the efficiency of the entire detection processing is improved.

The unsafe location enumeration unit 131 determines whether type confusion does not occur at a type level in type conversion occurring in memory loading, memory storing, and argument transferring of each command that can be specified from a source code, that is, whether a location of each command is an unsafe location.

For example, the unsafe location enumeration unit 131 determines the unsafe location in accordance with a scheme which is based on the language specifications of C or C++ and physical subtyping (Reference Literature 1: Chandra, S., et al. (1999) "Physical Type Checking for C") which is based on the language specifications. Since the unsafe location enumeration unit 131 does not assume exclusiveness of a type or a condition of a casting destination, the unsafe location enumeration unit 131 can cope with a class that has an inheritance relation.

By using physical subtyping, the unsafe location enumeration unit 131 can safely cope with a pointer type and a refinement type. The unsafe location enumeration unit 131 determines a castable relation and a partial type relation for a casting source type and a casting destination type.

Hereinafter, a refinement type will be described. The refinement type is defined as a type that varies depending on the condition depending on the value of the variable. Refinement type is also known as a mathematical target in academic discussion of a functional programming language type system.

For example, Reference Literature 2 (see Chugh, R., et al. (2012) "Nested refinements: a logic for click typing") discloses an implementation example of a refinement type system. According to the refinement type system described in Reference Literature 2, a property "a type of a value is determined when a certain condition is satisfied" of a union with a tag can be expressed.

However, in a refinement type system of the related art, since a tag and a value are considered as being inseparable, initialization is forced in generation of an object, and there is no pointer type, the present embodiment cannot be applied as it is.

For example, in definition of a structure of C and C++ which is a target programming language according to the present embodiment, a tag and a value are handled separately. In C and C++, processing from memory reservation to initialization is sequential, and the initialization is not performed when an object is generated. Safety is not guaranteed simply by adding a pointer type to a refinement type system of the related art.

In the present embodiment, a refinement type is notated, as illustrated in FIG. 3. FIG. 3 is a diagram illustrating an example of notation of a refinement type. Here, the refinement type which is expressed in detail in a field has different notations separately.

The same refinement type appears in a plurality of structures included in a structure including the refinement type.

Therefore, the same refinement type can be distinguished by recording an offset in the structure and a location to which the refinement type is applied. Accordingly, for example, such type confusion vulnerability in which only a tag of a refinement type in a certain place and a value of a refinement type in another place are set can be prevented from being missed.

Figure 4:
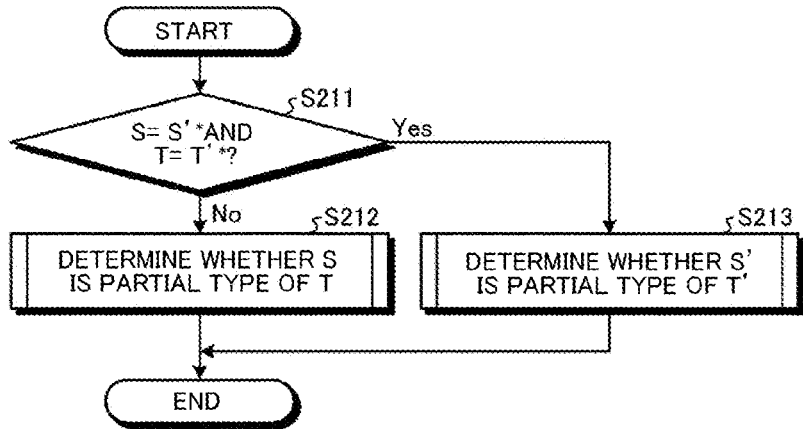
FIG. 4 is a flowchart illustrating a flow of determination processing of a castable relation.

As illustrated in FIG. 4, the unsafe location enumeration unit 131 performs determination processing for the castable relation. FIG. 4 is a flowchart illustrating a flow of determination processing of the castable relation. The unsafe location enumeration unit 131 outputs true when a type S can be cast to a type T through the processing of FIG. 4. Otherwise, the unsafe location enumeration unit 131 outputs false.

As illustrated in FIG. 4, the unsafe location enumeration unit 131 first determines whether S=S'* and T=T'* are satisfied (step S211). Here, * means a pointer type.

When S=S'* and T=T'* are not satisfied (No in step S211), the unsafe location enumeration unit 131 determines whether S is a partial type of T (step S212).

When S=S'* and T=T'* are satisfied (Yes in step S211), the unsafe location enumeration unit 131 determines whether S' is a partial type of T' (step S213).

Figure 5:
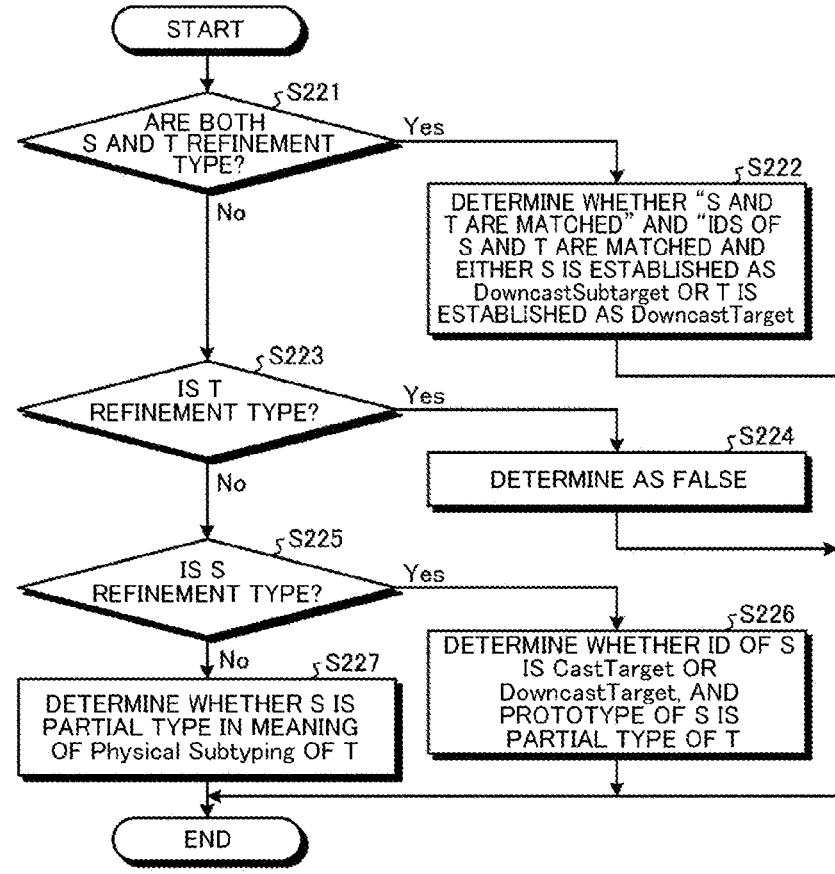
FIG. 5 is a flowchart illustrating a flow of determination processing of a partial relation.

A partial type determination method corresponding to steps S212 and S213 of FIG. 4 will be described with reference to FIG. 5. FIG. 5 is a flowchart illustrating a flow of determination processing for the partial relation.

The unsafe location enumeration unit 131 outputs true if the type S is a partial type of the type T through the processing of FIG. 5. Otherwise, the unsafe location enumeration unit 131 outputs false. In steps S212 and S213 of FIG. 4, an output by the processing of FIG. 5 is outputted as it is.

As illustrated in FIG. 5, the unsafe location enumeration unit 131 determines whether both S and T are refinement type (step S221).

When both S and T are the refinement type (Yes in step S221), the unsafe location enumeration unit 131 determines whether "S and T are matched," and "IDs of S and T are matched and either S is established in DowncastSubtarget or T is established in DowncastTarget" (step S222).

The unsafe location enumeration unit 131 outputs true when it is determined that the establishment is achieved in step S222. Otherwise, the unsafe location enumeration unit 131 outputs false.

When either of S and T is not a refinement type (No in step S221), the unsafe location enumeration unit 131 determines whether T is a refinement type (step S223). When T is the refinement type (Yes in step S223), the unsafe location enumeration unit 131 outputs false (step S224).

When T is not a refinement type (No in step S223), the unsafe location enumeration unit 131 determines whether S is the refinement type (step S225).

When S is the refinement type (Yes in step S225), the unsafe location enumeration unit 131 determines whether the ID of S is a CastTarget or a DowncastTarget and whether the prototype of S is the partial type of T (step S226).

The unsafe location enumeration unit 131 outputs true when it is determined in step S226 that the ID of S is CastTarget or DowncastTarget and the prototype of S is the partial type of T. Otherwise, the unsafe location enumeration unit 131 outputs false.

When S is not the refinement type (No in step S225), the unsafe location enumeration unit 131 determines whether S is the partial type in the meaning of Physical Subtyping of T (step S227).

The unsafe location enumeration unit 131 outputs true when it is determined in step S227 that S is the partial type in the meaning of Physical Subtyping of T. Otherwise, the unsafe location enumeration unit 131 outputs false.

The context extraction unit 132 transitions the automaton corresponding to the locations enumerated by the unsafe location enumeration unit 131 and extracts the context reaching the locations. The context extraction unit 132 is an example of an extraction unit.

The context extraction unit 132 traces a command in a reverse order on a location determined to be false by the unsafe location enumeration unit 131, that is, an unsafe location, and extracts an execution context (conditions which can reach the unsafe location) from a conditional branch or an assignment command.

The context extraction unit 132 can arbitrarily reconstruct a complicated and recursive expression only by designing a transition function indicating a way to process the command when the command is viewed in the extraction state by nesting the state of the automaton.

When one of the following conditions is satisfied, the context extraction unit 132 stops the subsequent analysis and outputs an automaton group generated until that.

(Condition 1-1) When the command does not step over the branch (when a branch command is traced, the number of branches coming from a block of a branch source is two or more) (Condition 1-2) When a side effect is hit, (when it is determined that the side effect is in the alias relation by typed based alias analysis (TBAA)) (Reference Literature 3: Diwan, A., et al. (1998) "Type based alias analysis," PLDI.)

Here, definition of the automaton will now be described. In this embodiment, an automaton "VarState" in a state of a variable specifying a variable included in a conditional expression to be extracted and an automaton "CondState" in a state of a conditional expression indicating a structure of a conditional expression which is being extracted are prepared.

In the present embodiment, when a conditional expression is extracted by the automaton "CondState" and a variable appears, the state transitions to a state including the automaton "VarState" and execution of the recursive expression and the extraction of the variable are simultaneously performed. Therefore, the automaton according the present embodiment is called a nested automaton in some cases.

The automaton "CondState" corresponds to a first automaton. The automaton "VarState" corresponds to a second automaton.

Definitions of the nested automaton will be described below.

Common Definition

Target variable state t: one of SearchIdent (during specifying) which is Unknow (unspecified) and Ident (id) (ID id of a refinement type is a candidate)
Pointer p to a field=&n [i][o]: a pointer to a field of a destination in which a variable name n is considered to be a pointer variable, an index is I, and an offset is o.
Type of casting k one of Downcast, Load, and Store
<Definition of Automaton "VarState">
First, definition of a state of the automaton is as follows.
[initial state] StartFrom (k, P, 1): A state indicating that transition is started from a pointer type P due to a location 1 of a command and the kind of casting k.
Targetptr (k, t, p, 1): a state indicating that a state of a target variable is t and a pointer to a field is p due to the location 1 of a command and a kind of casting k.

Deref(s): a state indicating a result in which the state s of VarState dereferenced (pointer reference).

[termination state] Baseptr (T, p, 1): a state indicating that the pointer p to the field has a refinement type T at location 1 of a command.

[termination state] HitSideEffect (s, 1): A state indicating that the state s of VarState is hit by a side effect at the location 1 of the command and is abnormally ended.

[termination state] Failed (s, 1): a state indicating a state s of CondState is abnormally ended at the location 1 of the command.

Next, definition of a state transition function of the automaton is as follows.

StartFrom (k, P, 1): at the time of a pointer type P' of which a type is a refinement type by a command to store the result in the variable v, when P and P' are matched as a refinement type, ID of the refinement type is id and Targetptr (k, Ident (id), &v [0] [0], 1) transition to a state of one-time transition by a current command.

Targetptr (k, t, p, 1)) It is assumed that the processing is branched in response to a given command (p=& [i] [o]).

When a side effect is not hit by a store command group in which P has already been analyzed in accordance with TBAA at the time of a load command from the variable v of the pointer type P (=T*) to the variable nm p'=& (*v) [i] [p] is set.

When t=Ident (_) is satisfied or not and t=Ident (id) is set using id as ID of the refinement type of P, the processing shifts to Baseptr (T, p', 1).

When t=Ident (_) is not satisfied, transition to Targetptr (k, SearchIdent, p', 1) is made.

When t=Ident (T) is satisfied, transition to Baseptr (T, p', 1) is made.

At the time of a pointer calculation command, a base pointer p'=&n' [i']I [o'] is obtained so that p becomes a result of pointer calculation, and transition to a state in which p and p' are exchanged is made.

a Deref(s) state s transitions to a given command and becomes the state s', transition to the state in which p and p' are exchanged is made.

<Definition of Automaton "CondState">

First, definition of the state of the automaton is as follows.

[initial state] StartBr (B): a state indicating that there is a command branched to a block name B.

[initial state] StartStore (id): A state indicating that there is a store command to the ID id of the refinement type.

CondVar (n, v): a state in which a conditional expression stored in the variable name v is extracted (where n indicates whether a conditional expression is negative).

Store (1, P, T, s, t): a state in which the state s (or t) of CondState to a substitution source (or a substitution destination) is included when a value of the type T is substituted into the pointer type P to the refinement type at the location 1.

BinOp (o, 1, r): a state in which the type o is a binary operator expression, and a state 1 (or r) of CondState with respect to the left side or the right side is included.

CmpOp (o, 1, r): a state in which the type o is a comparison operator expression, and a state 1 (or r) of CondState with respect to the left side or the right side is included Deref(s): a state indicating a result obtained by deferring to the state s of the CondState.

Var (t, n): a state in which the state of the target is t when the variable name n is searched for.

VarState(s) a state in which the state s of VarState is included.

[termination state] Const (c) a state indicating a constant C.

[termination state] Failed (s, 1): a state indicating that the state of CondState is abnormally ended at the location 1 of a command.

Next, definition of the state transition function of the automaton is as follows.

StartBr (B): When a conditional branch command depends on the variable n, a Boolean value c indicating whether the branch destination B is a true branch destination is specified and transition to CondVar (c, n) is made.

StartStore (id): When a store command for substituting the variable v of the type S into the variable v of the pointer type P is a store command and T does not hit the side effect by the already analyzed store command group in accordance with TBAA, transition to Store (1, P, S, Var (t, v), Var (Ident (id, v') is made. Here, if the value v is a refinement type, t=Ident (id) is set using the refinement type ID id. Otherwise, t=Unknown is set.

CondVar (n, v): In a command of the type o in which the variables 1 and r are compared and a result is stored in the variable v, the type o is negated with n, and transition to CmpOp (o', Var (Unknown, 1), Var (Unknown, r)) is made.

Var (t, n): In a binary operational command of the type o in which the variables 1 and r are received and a result is stored in the variable v, transition to BinOp (o, Var (t, 1), Var (t, r) is made. In a command in which a result is stored in another variable v, transitions to a state in which VarState (Targetptr (Load, t, &n [0] [0], 1) transitions once by a current command is made.

Store (L, P, T, s, t), BinOp (o, 1, r), CmpOp (o, 1, r): When the states 1 and r transition by a given command and become states l' and r', transition to a state in which 1 and r are exchanged to l' and 'r, respectively, is made.

Deref(s), VarState: when the state s transitions by a given command and becomes a state s', transition to a state in which s is exchanged to s' is made.

Figure 6:
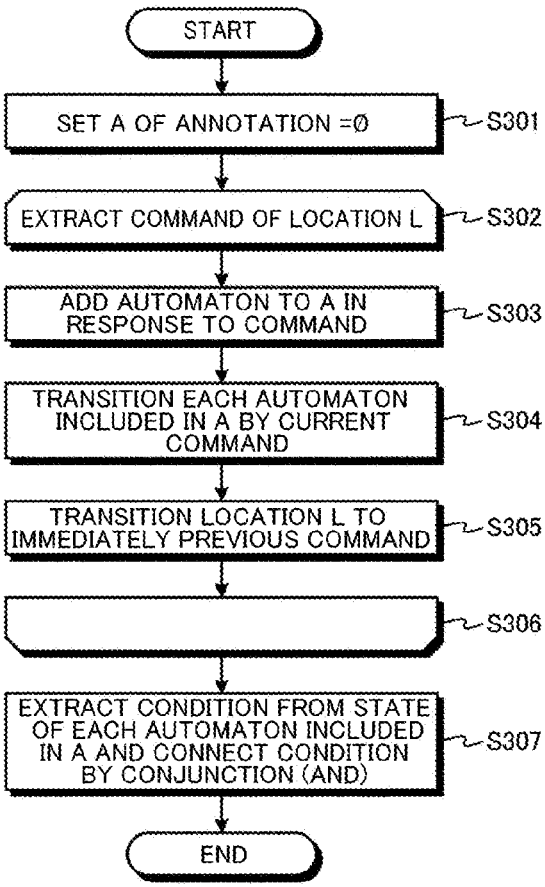
FIG. 6 is a flowchart illustrating a flow of processing for a nested annotation.

FIG. 6 is a flowchart illustrating a flow of processing of a nested automaton. As illustrated in FIG. 6, the context extraction unit 132 first sets a set A of the automaton as an empty set (step S301).

The context extraction unit 132 repeats processing from steps S302 to S306 on each of the unsafety locations enumerated by the unsafe location enumeration unit 131.

The context extraction unit 132 extracts a command of the location L (step S302). Then, the context extraction unit 132 adds an automaton to A in response to the command (step S303).

When the store destination type is a refinement type at the time of the store command, the context extraction unit 132 sets the ID of the refinement type as I and adds an automaton StartStore (I). The context extraction unit 132 adds an annotation StartBr (B) setting a block name of a branch destination as B at the time of a conditional branch command.

Subsequently, the context extraction unit 132 transitions each automaton included in A by a current command (step S304). Then, the context extraction unit 132 transitions the location L to the immediately previous command (step S305).

The context extraction unit 132 supplies a command as an input to the automaton by the above-described definition of the automaton, and transitions (updates) the state of the automaton.

The context extraction unit 132 extracts a condition from the state of each automaton included in A and connects the condition with by conjunction (AND) (step S307).

At this time, the context extraction unit 132 extracts and outputs a conditional expression from the state as follows by definition of the automaton.

A conditional expression of L and R is extracted from annotation Store (_, _, _, L, R) in the meaning of an annotation and a conditional expression of L=R is output.

A conditional expression of L and R is extracted from annotation CmpOp (c, L, R) and a conditional expression for comparing L and R is output according to the type c of comparison.

In cases other than the foregoing cases, true is outputted.

The vulnerability verification unit 133 verifies whether a location extracted by the context extraction unit 132 satisfies a prepared annotation. The vulnerability verification unit 133 is an example of a verification unit.

The annotation additionally provides a specification to be satisfied to a program to be analyzed.

The vulnerability verification unit 133 performs verification using a theoretical solver. The theoretical solver verifies whether a logical expression such as "B if A" is always established (appropriate) conservatively.

The term, conservatively, means that when it cannot be accurately determined whether a certain property is satisfied, the property is determined in one direction so that a pessimistic result is not obtained. For example, in the case of use in a context in which vulnerability is found conservatively, vulnerability is not missed. However, vulnerability can be determined although there is no vulnerability actually.

A theoretical solver in the present embodiment may be sound. For example, a general SMT solver (Z3, CVC4, or the like as being implemented).

The SMT solver is a kind of theoretical solver, and verification is performed by confirming whether establishment is achieved while substituting various values into variables of a logical expression (wisely).

The term, sound, means that a logical expression is not erroneously determined to be appropriate when the logical expression is used for the theoretical solver, but it is permitted that the logical expression determined to be appropriate is determined not to be actually appropriate.

The vulnerability verification unit 133 verifies whether a specification of an annotation is satisfied using an execution context extracted by the context extraction unit 132. When it cannot be determined that the specification of the annotation is not satisfied, a warning is output. For example, the vulnerability verification unit 133 outputs a list of locations that do not satisfy the specification of the annotation.

The vulnerability verification unit 133 can utilize a type inspection algorithm of an existing refinement type system as it is as a verification algorithm (for example, Reference Literature 4 (Chugh, R., et al. "Nested Refinements for Dynamic Languages." POPL'. Clause 12, 4)).

Here, an annotation will be described. First, the annotation can be described by defining conditions of a union with a tag as a refinement type. The vulnerability verification unit 133 verifies whether a location satisfies an annotation described by defining conditions of a union with a tag as a refinement type.

In the existing refinement type system, a data structure of the refinement type is freely fixed when the refinement type is defined, whereas in the annotation according to the present embodiment, a data structure in a given program can be regarded as the refinement type (made more detailed).

According to the annotation, a new refinement type can be defined by limiting an already existing refinement type. Therefore, when only a specific kind of type is actually stored in the refinement type, it is possible to cope with a pattern for which it is necessary to confirm a tag.

When the refinement type is applied, there are the following three casting patterns.

Pattern Cast: when an area of a tag variable and an area of a value are mutually exclusive.

Pattern Downcast: When an area of a tag variable is truly included in an area of a value Here, a casting destination is necessarily a partial type of a casting source.

Pattern Restrict: When the refinement type is applied to limit the existing refinement type.

The method follows the handling of the refinement type before limitation only by narrowing down candidates of the type of the casting destination A syntax of an annotation description language is as illustrated in FIG. 7. FIG. 7 is a diagram illustrating an example of a syntax of a description language of an annotation. FIG. 8 is a diagram illustrating an example of an annotation.

FIG. 9 is a diagram illustrating an example of an operation. FIG. 9 illustrates an example of an operation when a source code (here, Lua5.4.0) of a predetermined language is actually input to the detection device 10 according to the present embodiment.

First, as illustrated in (1) of FIG. 9, the unsafe location enumeration unit 131 enumerates casting locations (unsafe locations) which are not safe.

Next, as illustrated in (2), the context extraction unit 132 extracts a condition execution context in which an unsafe location is executed using a nested automaton.

Then, as illustrated in (3), the vulnerability verification unit 133 extracts a condition from the termination condition of the automaton and verifies whether the specification is satisfied by a theoretical solver.

Effects of First Embodiment

As described above, the unsafe location enumeration unit 131 enumerates, based on the code of the program, locations that do not satisfy a predetermined condition indicating that the type conversion is safe among locations where the type casting occurs in the program. The context extraction unit 132 transitions the automaton corresponding to the location enumerated by the unsafe location enumeration unit 131, and extracts a context reaching the location. The vulnerability verification unit 133 verifies whether the location extracted by the context extraction unit 132 satisfies a annotation prepared in advance.

The detection device 10 can detect the type confusion vulnerability on the assumption of presence of a pointer in accordance with the foregoing method. As a result, according to the present embodiment, type confusion vulnerability can be detected efficiently.

The unsafe location enumeration unit 131 determines a castable relation and a partial type relation in a casting source type and a casting destination type. Accordingly, even when there are both a pointer type and a refinement type, it is possible to safely cope with the pointer type and a refinement type.

When a variable appears during extraction of a conditional expression by the first automaton, the context extraction unit 132 recursively specifies the variable using a second automaton for specifying the variable. Accordingly, a complicated and recursive expression can be arbitrarily reconstructed only by designing a way to process when the command is viewed in a state where the conditional expression is being extracted by one automaton (transition function). The vulnerability verification unit 133 verifies whether annotation describing a condition of the union with the tag as a refinement type is satisfied at the location enumerated by the unsafe location enumeration unit 131. Accordingly, verification can be performed without fixing the refinement type of data structure.

[System Configuration and the Like]

Each component of each of the illustrated devices is a functional conceptual component and is not required to be physically configured as illustrated in the drawings. That is, specific forms of distribution and integration of the devices are not limited to the forms illustrated in the drawings, and some or all of the devices can be distributed or integrated functionally or physically in any units according to various loads, use situations, or the like. Further, some or all of the processing functions to be implemented in the devices can be realized by a central processing unit (CPU) and a program analyzed and executed by the CPU, or can be realized as hardware using a wired logic. The program may be executed not only by the CPU but also by another processor such as a GPU.

Further, some or all of the processing described as being performed automatically among the processing described in the present embodiment can be performed manually, or some or all of the processing described as being performed manually can be performed automatically using a known method. In addition, information including the processing procedures, control procedures, specific names, and various types of data or parameters illustrated in the foregoing literatures or drawings can be arbitrarily changed unless otherwise mentioned.

[Program]

The detection device 10 according to an embodiment can be implemented by installing a detection program for executing the detection processing in a desired computer as packaged software or on-line software. For example, an information processing device can be caused to function as the detection device 10 by causing the information processing device to execute the foregoing detection program. Here, the above-mentioned information processing device includes a desktop or laptop personal computer. Further, a mobile communication terminal such as a smartphone, a mobile phone, or a personal handyphone system (PHS), or a slate terminal such as a personal digital assistant (PDA), for example, is included in a category of the information processing device.

The detection device 10 may be implemented as a detection server device which provides a service related to the foregoing detection processing to a client which is a terminal device used by a user. For example, a detection server device is implemented as a server device that provides a detection service in which a source code is input and candidate locations of type confusion vulnerability are output. In this case, the detection server device may be implemented as a web server or may be implemented as a cloud that provides services related to the foregoing detection processing by outsourcing.

Figure 10:
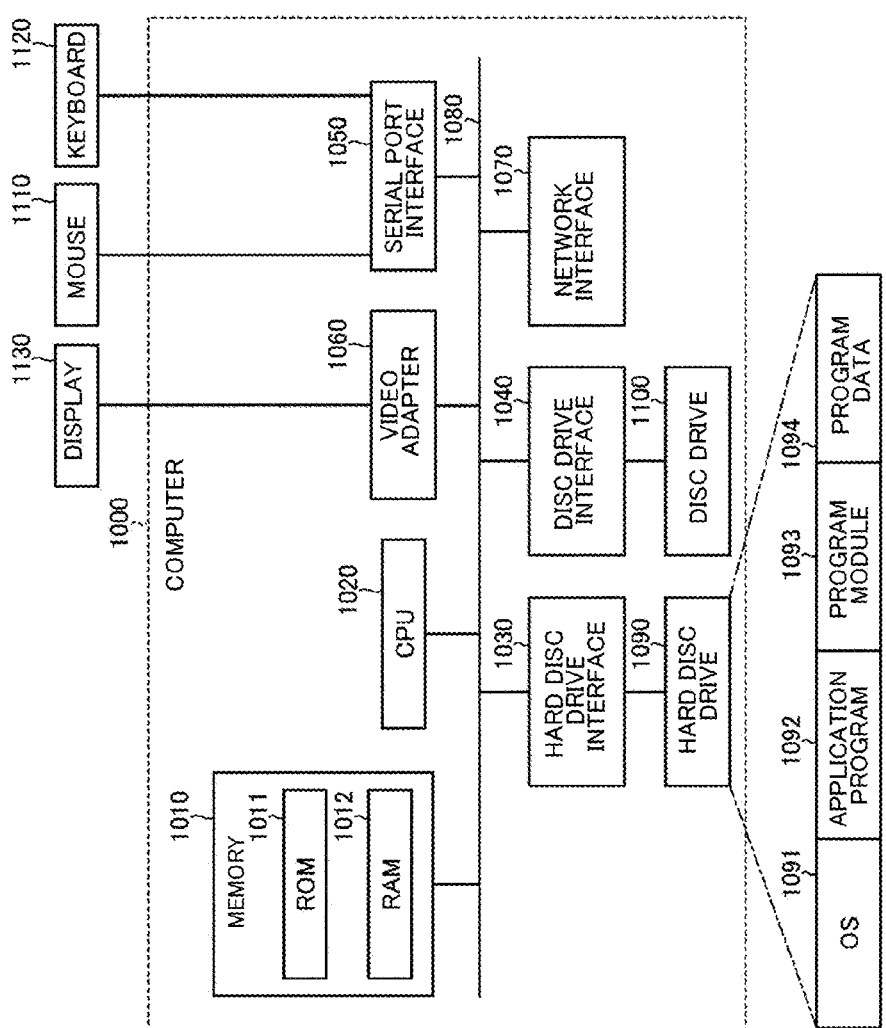
FIG. 10 is a diagram illustrating an example of a computer that executes a detection program.

FIG. 10 is a diagram illustrating an example of a computer that executes the detection program. A computer 1000 includes, for example, a memory 1010 and a CPU 1020. The computer 1000 also includes a hard disk drive interface 1030, a disk drive interface 1040, a serial port interface

1050, a video adapter 1060, and a network interface 1070. These units are connected to one another via a bus 1080.

The memory 1010 includes a read only memory (ROM) 1011 and a random access memory (RAM) 1012. The ROM 1011 stores, for example, a booting program such as a basic input output system (BIOS). The hard disk drive interface 1030 is connected to the hard disk drive 1090. The disk drive interface 1040 is connected to a disk drive 1100. For example, a removable storage medium such as a magnetic disk or an optical disc is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. That is, a program defining each processing of the detection device 10 is implemented as the program module 1093 in which a code that can be executed by the computer has been described. The program module 1093 is stored in, for example, the hard disk drive 1090. For example, the program module 1093 executing the same processing as a functional configuration in the detection device 10 is stored in the hard disk drive 1090. The hard disk drive 1090 may be replaced with a solid state drive (SSD).

Further, setting data to be used in the processing of the above-described embodiment is stored as the program data 1094 in, for example, the memory 1010 or the hard disk drive 1090. The CPU 1020 reads the program module 1093 or the program data 1094 stored in the memory 1010 or the hard disk drive 1090 to the RAM 1012, as necessary, and executes the processing of the above-described embodiment.

The program module 1093 and program data 1094 are not limited to being stored in the hard disk drive 1090 and may also be stored in, for example, a removable storage medium to be read out by the CPU 1020 via the disk drive 1100 or the like. Alternatively, the program module 1093 and the program data 1094 may be stored in another computer connected via a network (a local area network (LAN), a wide area network (WAN), or the like). In addition, the program module 1093 and the program data 1094 may be read by the CPU 1020 from the other computer via the network interface 1070.

REFERENCE SIGNS LIST

10 Detection device
11 Interface unit
12 Storage unit
13 Control unit
121 Annotation information
131 Unsafe location enumeration unit
131 Castable relation determination unit
131b Partial relation determination unit
132 Context Extraction unit
133 Vulnerability verification unit

The invention claimed is:

1. A detection device comprising a processor configured to execute operations comprising:

enumerating, based on a code of a program, a plurality of locations in the code of the program, wherein the plurality of locations does not satisfy a predetermined condition, and the predetermined condition indicates that type conversion is safe at the plurality of locations where a type casting occurs in the program;

transitioning an automaton corresponding to the plurality of locations, wherein the automaton further includes a first sub automaton specifying a variable included in a conditional expression and a second sub automaton that indicates a structure of the conditional expression;

extracting a context reaching the plurality of location and updates the automaton;

verifying whether a location of the plurality of locations satisfies a predetermined annotation; and transmitting a result of verifying to an application configured to display the result of verifying the code of the program, wherein the result of verifying describes a type confusion vulnerability of the code of the program.

2. The detection device according to claim 1, wherein the enumerating further comprises determining a castable relation and a partial type relation in a casting source type and a casting destination type.

3. The detection device according to claim 1, wherein, when a variable appears during extraction of a conditional expression by the first sub automaton, the transitioning the automation further comprises specifying the variable using the second sub automaton, and the second sub automation specifies the variable.

4. The detection device according to claim 1, wherein the verifying further comprises verifying whether the location satisfies an annotation described by defining a condition of a union with a tag as a refinement type.

5. The detection device according to according to claim 1, wherein the code of the program represents a program code for execution by a computer, and the program code is expressed either in C language or C++ language.

6. The detection device according to according to claim 1, wherein the result of verifying indicates a location of type confusion vulnerability of the code of the program.

7. The detection device according to according to claim 1, wherein the predetermined annotation indicates a data structure describing a condition of a union with a tag as a refinement type of a code.

8. A detection method, comprising:

enumerating, based on a code of a program, a plurality of locations in the code of the program, wherein the plurality of locations does not satisfy a predetermined condition, and the predetermined condition indicates that type conversion is safe at the location where a type casting occurs in the program;

transitioning an automaton corresponding to the plurality of locations, wherein the automaton further includes a first sub automaton specifying a variable included in a conditional expression and a second sub automaton that indicates a structure of the conditional expression;

extracting a context reaching the plurality of locations and updates the automaton;

verifying whether a location of the locations satisfies a predetermined annotation; and transmitting a result of verifying to an application configured to display the result of verifying the code of the program, wherein the result of verifying describes a type confusion vulnerability of the code of the program.

9. The detection method of claim 8, wherein the enumerating further comprises determining a castable relation and a partial type relation in a casting source type and a casting destination type.

10. The detection method of claim 8, wherein, when a variable appears during extraction of a conditional expression by the first sub automaton, the transitioning the automation further comprises specifying the variable using the second sub automaton, and the second sub automation specifies the variable.

11. The detection method of claim 8, wherein the verifying further comprises verifying whether the location satisfies an annotation described by defining a condition of a union with a tag as a refinement type.

12. The detection method of claim 8, wherein the code of the program represents a program code for execution by a computer, and the program code is expressed either in C language or C++ language.

13. The detection method of claim 8, wherein the predetermined annotation indicates a data structure describing a condition of a union with a tag as a refinement type of a code, and the result of verifying indicates a location of type confusion vulnerability of the code of the program.

14. A computer-readable non-transitory recording medium storing computer-executable program instructions that when executed by a processor cause a computer to execute operations comprising:

enumerating, based on a code of a program, a plurality of locations in the code of the program, wherein the plurality of locations does not satisfy a predetermined condition, and the predetermined condition indicates that type conversion is safe at the plurality of locations where a type casting occurs in the program;

transitioning an automaton corresponding to the plurality of locations, wherein the automaton further includes a first sub automaton specifying a variable included in a conditional expression and a second sub automaton that indicates a structure of the conditional expression;

extracting a context reaching the plurality of location and updates the automaton; and verifying whether a location of the plurality of locations satisfies a predetermined annotation; and transmitting a result of verifying to an application configured to display the result of verifying the code of the program, wherein the result of verifying describes a type confusion vulnerability of the code of the program.

15. The computer-readable non-transitory recording medium according to claim 14, wherein the enumerating further comprises determining a castable relation and a partial type relation in a casting source type and a casting destination type.

16. The computer-readable non-transitory recording medium according to claim 14, wherein, when a variable appears during extraction of a conditional expression by the first sub automaton, the transitioning the automation further comprises specifying the variable using the second sub automaton, and the second sub automation specifies the variable.

17. The computer-readable non-transitory recording medium according to claim 14, wherein the verifying further comprises verifying whether the location satisfies an annotation described by defining a condition of a union with a tag as a refinement type.

18. The computer-readable non-transitory recording medium according to claim 14, wherein the code of the program represents a program code for execution by a computer, and the program code is expressed either in C language or C++ language.

19. The computer-readable non-transitory recording medium according to claim 14, wherein the predetermined annotation indicates a data structure describing a condition of a union with a tag as a refinement type of a code.

20. The computer-readable non-transitory recording medium according to claim 14, wherein the result of verifying indicates a location of type confusion vulnerability of the code of the program.

* * * * *